March 11, 1924.
W. HILGERS
1,486,748
COMBINED MOLDING AND WRAPPING UP MACHINE FOR BUTTER, MARGARINE, AND THE LIKE
Filed Oct. 29, 1921   2 Sheets-Sheet 1
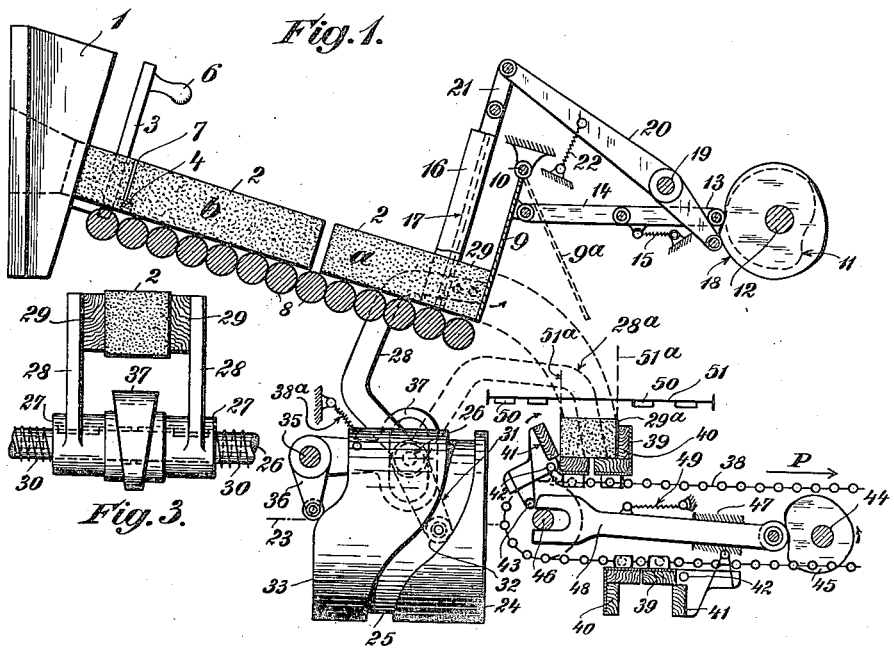
Fig. 1.
Fig. 3.
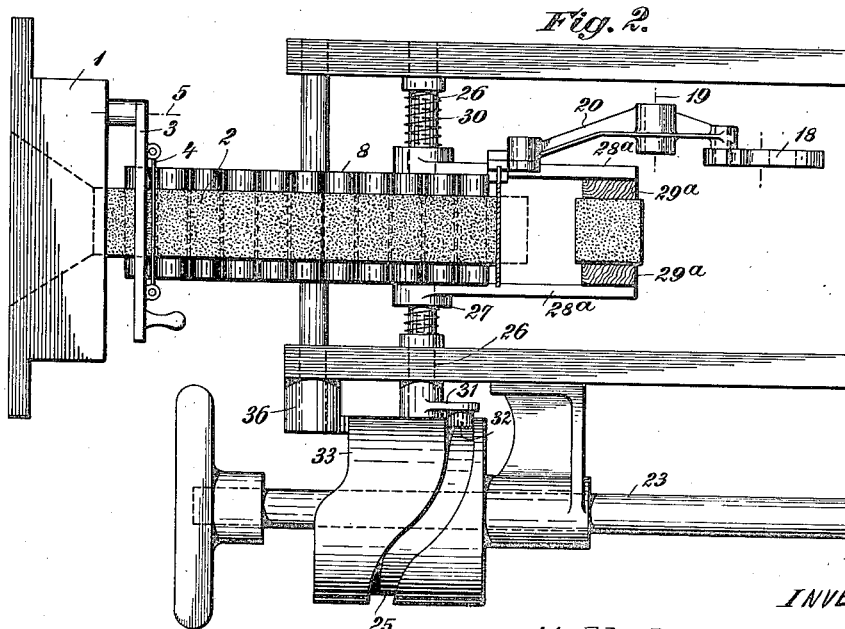
Fig. 2.
INVENTOR
Wilhelm Hilgers.
William C. Linton
Attorney.

March 11, 1924.
W. HILGERS
1,486,748
COMBINED MOLDING AND WRAPPING UP MACHINE FOR BUTTER, MARGARINE, AND THE LIKE
Filed Oct. 29, 1921  2 Sheets-Sheet 2
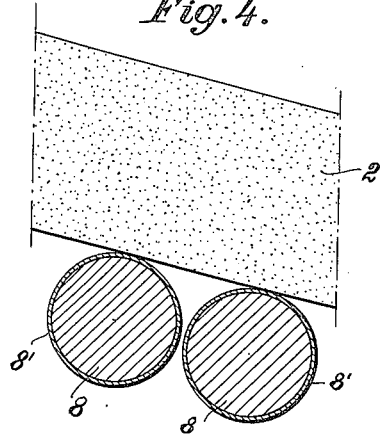
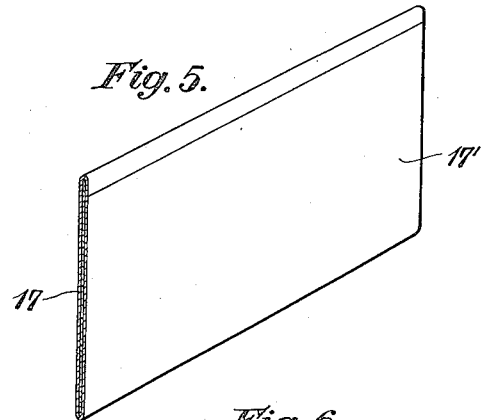
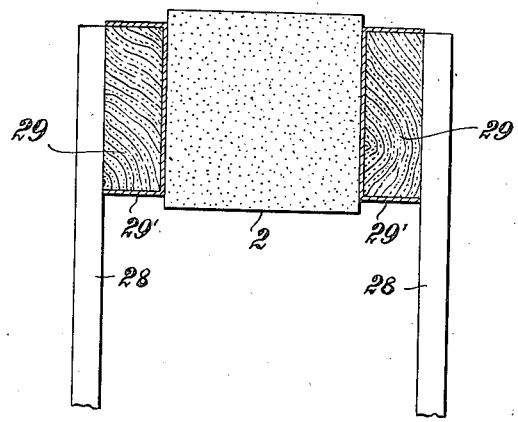
INVENTOR.
William Hilgers.
By William C. Linton
Atty.

Patented Mar. 11, 1924.

1,486,748

UNITED STATES PATENT OFFICE.

WILHELM HILGERS, OF DUSSELDORF, GERMANY.

COMBINED MOLDING AND WRAPPING-UP MACHINE FOR BUTTER, MARGARINE, AND THE LIKE.

Application filed October 29, 1921. Serial No. 511,524.

*To all whom it may concern:*

Be it known that I, WILHELM HILGERS, engineer, a citizen of German Republic, residing at Dusseldorf, in the Republic of Germany, have invented certain new and useful Improvements in Combined Molding and Wrapping-Up Machines for Butter, Margarine, and the like; and I hereby declare that the following is a full, clear, and exact description of the invention, such as will enable others skilled in the art to which it appertains to make and use the same.

This invention relates to a machine which molds butter, margarine, lard, and the like, into pieces of equal shape and size and wraps up, or envelops these pieces into paper.

Machines for molding materials of the kind mentioned are known, as are also machines for wrapping up, or enveloping, the molded pieces, but these latter must be conveyed by hand from the first machine to the second, so that the combined output of the machines depends upon the capableness of the intensely occupied operator, the more, as he must pay special attention to correctly place the material into, or upon, the machine. Conveying the substance to be treated mechanically from the one machine to the other is connected with technical difficulties in so far as, concerning the wrapping-up machine, the output is proportional to the number of revolutions, which, however, is not the case with the molding machine, because this latter delivers the material, similarly to a tile-press or the like, in the form of a beam, the material being continuously pressed forward by means of a worm. The endeavours to compensate the differences thereby produced by special devices have not been successful owing to the stickiness or adhesiveness of the material.

Now, according to the present invention, the molding machine employed in the combination is an ordinary molding machine, the action of which, however, is restricted to the pressing out of the beam of material, whereas the cutting-off of the single pieces from that beam is effected by a special device which forms part of the wrapping-up machine and is positively connected with it and to which a cut-off piece of the beam glides automatically upon rollers as fully described hereinafter and shown, by way of example, in the accompanying drawing, in which similar numbers of reference denote similar parts throughout the several views, and in which Figure 1 is a side view of an arrangement and combination of parts embodying my invention. Figure 2 is a plan of it, Figure 3 shows a detail which is also duly referred to hereinafter, Figure 4 is a sectional view through a part of the rollers showing a beam of butter thereon, Figure 5 is a perspective view of the cutting knife and Figure 6 is a vertical section through the grippers and beam of butter.

Referring to Figures 1 and 2, 1 is the mouth-piece of a press, through the front opening of which a worm (not shown) presses, or worms press, the beam 2 of butter or the like similarly to the action of a tile-press or the like. 3 is a three-sided frame, the fourth side of which is formed by a stretched and strained wire 4. The frame 3 may be turned upon or around the pivot 5 and is provided with a handle 6. In the position shown the wire 4 has the beam 2 cut through in the line 7.

8 is an inclined set of rollers each having a paper covering 8' upon which the cut-off piece of the beam 2 rolls spontaneously down until it is stopped by a plate or flap 9. This latter is hinged at 10 to pivots or the like and may swing from the position 9 into the position 9ª, and reversely; the motion from 9ª to 9 is effected by an eccentric or cam 11 which is affixed to the shaft 12 that rotates with uniform speed; the motion from 9 to 9ª is effected by a spring 15.

Between the plate 9 and the frame 3 is a two-sided guide 16 in which reciprocates a slide 17, having a paper covering 17" the lower edge of which forms a cutting edge which cuts through the beam 2 in certain distinct intervals of time, subdividing the cutoff piece of the beam into a plurality of single pieces of equal size. The slide 17 is moved upwards by means of a link 21, a double-armed lever 20 fulcrumed at 19, and an eccentric or cam 18 also affixed to the shaft 12. Lowering the slide 17 is effected partly by the own weight of the parts concerned, partly by a tension spring 22.

23, Figure 2, is a continuously rotating shaft to which is secured a drum 24 having an axially curved groove 25 and a cam-surface 33. A shaft 26 is arranged at right angles to the shaft 23 below the guide 16 and two slideable hubs 27 are arranged upon it; they are prevented from turning upon the shaft 26 by suitable means, such as feathers and grooves, and are subjected to the pressure of springs 30 encompassing the shaft 26 and acting in the opposite direction to one another. Each hub 27 has attached to it a crooked arm 28 which in its turn has attached to it a gripping block 29, which has its upper, inner and lower surfaces provided with a paper covering 29' (the numerals 28ª and 29ª in Figure 2 indicate another position of the parts 28 and 29). Owing to the pressure of the springs 30 the gripping blocks 29 are pressed against the beam of butter or the like, and are capable of conveying the cut-off single pieces from their place upon the rollers 8 to another place, as will be described later on. Adjacent to the drum 24 the shaft 26 is provided with a downwardly directed crank 31 having a roll 32 engaging the groove 25 of the drum, whereby the rotary motion of the drum is transformed into a swinging motion of the crank 31, the shaft 26, the arms 28, and the grippers 29.

The cam surface 33 of the drum 24 cooperates with a crank 36 secured to a shaft 35 which is parallel to the shaft 26. A lever 37 (Figures 1 and 3), the free end of which forms an oblong eye, is affixed to the shaft 35 below the rollers 8. The lever 37 is reciprocated in a vertical plane in the one direction by the cam surface 33 and the crank 36 and in the other direction by a spring 38ª. The eye of the lever 37 embraces the shaft 26 just between the hubs 27 of the arms 28; it is wedge-shaped, as shown in Figure 3, and the adjacent surfaces of the hubs 27 are correspondingly shaped, so that the hubs and the arms 28 are moved asunder when the lever 37 swings downwards. The springs 30 press the hubs 27 against the eye of the lever 37, or against the eye 37 respectively, so that the parts 27, 37, 27 remain in contact also during the upward motion of said parts 37. Displacing the hubs with their arms in contrary directions is effected only at the end of the downward motion of the arms with their grippers, as is more fully described later on.

38, Figure 1, is an endless chain which is moved in steps in the direction of the arrow by any suitable driving means. Attached to the chain 38, in certain distances from one another, are three-walled boxes 39 of such a shape and size that each is capable of receiving one of the cut-off pieces of the beam of butter or the like. Each box consists of a bipartite bottom 39, a front wall 40, and a rear wall 41. The wall 40 is firmly connected with its associate bottom part, but the wall 41 is hinged to its associate bottom part at 42 and is, moreover, provided with a drag roll 43.

The continuously rotating shaft 44 (Figure 1) has affixed to it an eccentric or cam 45 which actuates a forked bar 48 which is supported in a slide-bearing 47 and by a rod 46 passing through the gap of the fork. The bar 48 is reciprocated in the one direction by said eccentric or cam and in the other direction by a spring 49. Displacing the rod 46 to the left (Fig. 1) occurs in that moment in which a box 39, 40, 41 has received a piece of material, as in Figure 1; then the upper leg of the fork lifts the roll 43 of the respective rear wall 41 and turns this wall into vertical position so as to close the box at its rear side. The box remains closed during its further way because the horizontal arm, to the rear end of which the roll 43 is attached, remains lying upon the chain.

The manner of operation of the combination and arrangement of parts described is as follows:

Assuming that butter is to be molded and wrapped-up or enveloped, the butter is delivered by and from the press 1 as a beam. Supposing, $a$ be a remainder of the piece of beam just in course of subdivision, etc., and the press 1 be at a stand-still during the time of that subdivision, etc. When the sub-division, etc., has advanced so far that a piece like $a$ is lying upon the rollers 8, the press 1 is set in motion, when the piece of beam $b$ will be pressed out and brought forward in the direction of the piece $a$. Shortly before the two pieces contact with each other, the press 1 is set at rest and then the piece $b$ is cut off by means of the frame 3 with its wire 4. Instantly after this the piece $b$ rolls down upon the rollers 8 and joins the piece $a$ uniting with it practically into one piece. This piece is retained in position, for the given moment, by the plate or flap 9. Now the slide 17 is moved downwards and cuts such a piece of butter as is to be wrapped up off the piece $(b)$ $a$; then the lever-eye 37 moves upwards, the grippers 29 take hold of the cut-off piece of butter, the flap 9 moves from the position shown in Figure 1 in full lines into the position shown in dotted lines, the arms 28 with the grippers and the piece of butter swing downwards and place this latter into the box 39—40—41 which is just in the proper position to receive that piece.

Prior to this, a sheet of paper 51 (Figure 1) had been placed by suitable means (not shown) upon bars 50 the arrangement being such that the descending piece of butter pushes upon that sheet and presses it down into the box 39—40—41 whereby the inner box walls are lined with that paper which, thus, prevents a direct contact of the box walls with the butter. The length of the piece of paper and its position relatively to the piece of butter is such that the paper when having arrived in the box is in a U- shaped position, as indicated by the dotted line 51ª (Figure 1). In the next moment the wall 41 of the box is turned so as to stand parallel to the wall 40; then the chain with the box, or boxes respectively, makes another step conveying another box to and below the place where the single pieces of butter are delivered. Finishing the wrapping-up is effected by means which do not form part of the invention and are, therefore, neither shown nor described.

The motions of the co-operating parts are, of course, appropriately timed, concerning their forward or working motion, as well as their rear motion during which they return to their former or initial position. When the piece of beam (b) a, or b respectively (because a has been consumed), has become as short as the piece a in Figure 1, another piece like b is made to proceed forth upon the rollers 8 until it nearly contacts with the piece a, when it is again cut through by means of the wire 4 of the frame 3, as above described.

The construction of the slide 17 and of the flap 9 is particularly important for an undisturbed operation of the machine. It is known that butter, margarine, and similar fats, can be smoothly cut only with wet wooden blades or with strained wire, because the other cutting materials that might, perhaps, be considered for the purpose in question make the fat to be cut stick or adhere to them in such a manner that, in fact, the other materials cannot be considered for that purpose. Even a strained thin wire must be cleaned nearly after each cut. The slide 17 and the flap 9 cannot, however, be replaced by wires because such ones cannot stop the beam of fat. Also a wooden slide cannot be employed because, to be sufficiently stiff, its thickness must be such that the beam of fat would be squeezed and obtaining single pieces of equal size, shape, and weight, would be made impossible whereby the machine would be rendered useless. Similar difficulties, although of a lesser degree, are experienced with the rolls 8 and the gripping blocks 29. To overcome the difficulties in question, I cover all parts concerned with parchment paper, to which butter and the like does not adhere. This is a contrivance by which the economy of the machine is greatly improved.

Having now described my invention, what I desire to secure by a patent in the United States is:—

1. A combined molding and wrapping-up machine for butter, margarine, and the like, comprising, in combination, a press adapted to deliver a beam of the material to be proceeded with; a wrapping-up machine arranged in front of the delivery opening of said press on a lower level; a set of rollers so arranged as to be adapted to allow pieces of said beam of material to roll down to said wrapping-up machine; a flap arranged at the lower end of said set of rollers; means located near to the said press and being adapted to cut off a comparatively long piece of the beam of material; and means located near to said flap and being adapted to cut off from said long piece such short pieces as are to be wrapped up.

2. A combined molding and wrapping-up machine for butter, margarine, and the like, comprising, in combination, a press adapted to deliver a beam of the material to be proceeded with; a wrapping-up machine arranged in front of the delivery opening of said press on a lower level; a set of rollers so arranged as to be adapted to allow pieces of said beam of material to roll down to said wrapping-up machine; a flap arranged at the lower end of said set of rollers; cutting means located near to the said press and being adapted to be operated by hand; and cutting means located near to the said flap and being adapted to be automatically operated.

3. A combined molding and wrapping-up machine for butter, margarine, and the like, comprising, in combination, a press adapted to deliver a beam of the material to be proceeded with; a wrapping-up machine arranged in front of the delivery opening of said press on a lower level; a set of rollers so arranged as to be adapted to allow pieces of said beam of material to roll down to said wrapping-up machine; a flap arranged at the lower end of said set of rollers; cutting means located near to the said press and being adapted to be operated by hand for cutting off comparatively long pieces of the beam of material; a cutting slide located near to the said flap and being adapted to be automatically operated and to cut off from one of said long pieces such short pieces as are to be wrapped up; and grippers so arranged as to be adapted to grip one of said short pieces and convey it to the wrapping-means.

4. A combined molding and wrapping-up machine for butter, margarine, and the like, comprising, in combination, a press adapted to deliver a beam of the material to be proceeded with; a wrapping-up machine arranged in front of the delivery opening of said press on a lower level; a set of rollers so arranged as to be adapted to allow pieces of said beam of material to roll down to said wrapping-up machine; a flap arranged at the lower end of said set of rollers; cutting means located near to the said press and being adapted to be operated by hand for cutting off comparatively long pieces of the beam of material; a cutting slide located near to the said flap and being adapted to be automatically operated and to cut off from one of said long pieces such short pieces as are to be wrapped up; and grippers so arranged as to be adapted to grip one of said short pieces and convey it to the wrapping-means; said rollers, said cutting slide, and said grippers, being covered with parchment paper.

5. A combined molding and wrapping-up machine for butter, margarine, and the like, comprising, in combination, a press adapted to deliver a beam of the material to be proceeded with; a wrapping-up machine arranged in front of the delivery opening of said press on a lower level; a set of rollers so arranged as to be adapted to allow pieces of said beam of material to roll down to said wrapping-up machine; a flap arranged at the lower end of said set of rollers; means located near to the said press and being adapted to cut off a comparatively long piece of the beam of material; and means located near to said flap and being adapted to cut off from said long piece such short pieces as are to be wrapped up; wrapping-up boxes having each a tiltable rear wall; means for holding said wall in oblique position during the time of placing the piece of material into the box; and means for then turning the said wall into normal position.

In witness whereof I have hereunto set my hand.

WILHELM HILGERS.